United States Patent

Vonder Haar et al.

[11] Patent Number: 6,137,878
[45] Date of Patent: Oct. 24, 2000

[54] METHOD FOR OUTPUTTING USER FEEDBACK AUDIO MESSAGES AND TELECOMMUNICATIONS EQUIPMENT EMPLOYING SAID METHOD

[75] Inventors: Kim Marie Vonder Haar, Sawbridgeworth, United Kingdom; Philip Hodgson, Plantation, Fla.

[73] Assignee: Nortel Networks Limited, Montreal, Canada

[21] Appl. No.: 09/049,708

[22] Filed: Mar. 28, 1998

[51] Int. Cl.$^7$ ............................ H04M 1/00; H04M 11/00
[52] U.S. Cl. ....................................... 379/361; 379/102.07
[58] Field of Search .................................... 379/361, 374, 379/93.26–93.28, 102.01–12.07, 106.01, 75, 77; 434/335, 169, 201; 704/275, 251, 270

[56] References Cited

U.S. PATENT DOCUMENTS

| | | | |
|---|---|---|---|
| 4,095,050 | 6/1978 | Beachem et al. | 379/102.07 |
| 4,466,801 | 8/1984 | Dittakavi et al. | 434/335 |
| 5,357,596 | 10/1994 | Takebayashi et al. | 704/275 |

FOREIGN PATENT DOCUMENTS

| | | |
|---|---|---|
| 2 266 820 | 11/1993 | United Kingdom . |
| 2 300 994 | 11/1996 | United Kingdom . |

*Primary Examiner*—Wing F. Chan
*Attorney, Agent, or Firm*—Lee, Mann, Smith, McWilliams, Sweeney & Ohlson

[57] ABSTRACT

Speech messages as user feedback audio signals in electrical/electronic apparatus are more informative to users and better at holding their attention. However, in telecommunications equipment involving transmission of data or signals over a link that has finite capacity, speech messages as user feedback audio signals are considered undesirable due to their deleterious effect on transmission link capacity. In such equipment, user feedback audio signals normally comprise generic beeps consisting of single tones or a short series of discreet tones. The invention provides a method of providing plural signals as user feedback audio signals in telecommunications equipment where the total structure of the feedback signals encapsulates the underlying speech rhythms ie prosodic patterns of corresponding speech messages. In a digital system, the bit size of user feedback signals in accordance with the invention are no greater than those for the generic beeps presently employed.

46 Claims, 7 Drawing Sheets

METHOD FOR OUTPUTTING USER FEEDBACK AUDIO MESSAGES AND TELECOMMUNICATIONS EQUIPMENT EMPLOYING SAID METHOD

FIELD OF THE INVENTION

The present invention relates to a method for outputting user feedback audio messages and telecommunications equipment employing said method. The invention is particularly intended for use with desktop telephone devices which afford access to telecommunication subscriber services such as the selection of long distance carriers according to toll charge, for example. It should be understood, however, that the method of the invention is applicable to any device or system with which a user interacts and which employs user feedback audio signals.

BACKGROUND OF THE INVENTION

Single tones and discrete tone sequences as audio feedback signals in telecommunications equipment such as desktop telephones and mobile telephone handsets normally comprise generic beeps. Such single tones and discrete tone sequences do not convey any explicit information and are thus context bound. Users of the equipment learn the meaning of the single tones and discrete tone sequences through association with the task(s) currently being performed. Hitherto, such single tones and discrete tone sequences have been determined arbitrarily and then qualified through user testing. Experience reveals that such tones are often not closely attended to by users and, in fact, are often ignored. The fact that users can eventually learn what the tones mean for a particular user interaction with a device is based largely on practice and continual, repetitive exposure to the tones. Whilst tones currently employed in known devices as user feedback audio signals can be effective, they necessitate user learning and are not innately recognisable by the user nor are they culturally universal.

SUMMARY OF THE INVENTION

Accordingly, it is an object of the present invention to provide a method for outputting user feedback audio signals in telecommunications equipment and other devices and systems which are innately recognisable by users of the equipment, devices and systems.

It is a further object of the invention to provide telecommunications equipment and other devices and systems employing user feedback audio signals which are innately recognisable by users of the equipment, devices and systems.

It is a yet further object of the invention to provide telecommunications equipment and other devices and systems employing user feedback audio signals which are culturally universal.

Briefly described, in accordance with the present invention, a method for outputting user feedback audio signals comprises the steps of: storing an audio signal on an audio signal storage medium; outputting said audio signal on speaker means; and controlling said audio signal storage medium to output the audio signal to the speaker means in response to a user interaction with an apparatus associated with the speaker means, wherein said audio signal encapsulates a predetermined prosodic pattern. The prosodic pattern is preferably one which is innately recognisable to humans.

DESCRIPTION OF THE PREFERRED EMBODIMENTS

Figure 1A:
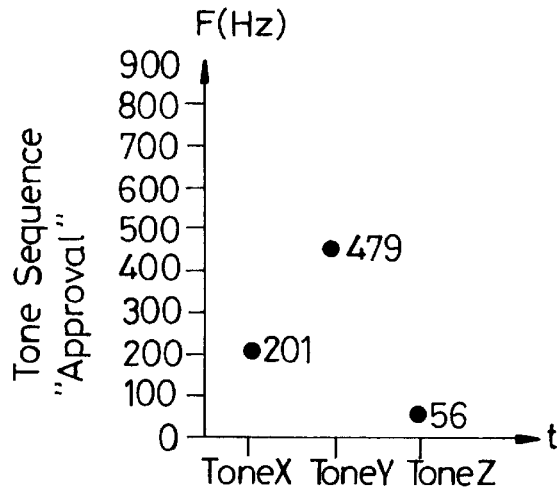
FIG. 1A is a frequency time graph of a first discrete tone sequence encapsulating a first prosodic pattern in accordance with the invention.

The foregoing and further features of the present invention will be more readily understood from the following detailed description of preferred embodiments, by way of example thereof, and with reference to the accompanying drawings.

"Motherese" and "parentese" are the common names given to the study of the way in which parents communicate with their children, particularly babies. It has been found that all parents in all cultures and of all languages employ generally the same prosodic patterns (intonation patterns) when conveying primary messages to their children. The four generally recognised primary messages comprise "approval", "prohibition" (ie "don't do that"), "attention" and "comfort". These prosodic patterns are characterised by:

1. a higher mean frequency (when a parent is conveying a primary message to a child compared with conveying the same message to an adult); and
2. a much larger frequency range (bandwidth). For example, it has been found that for at least one of the primary messages, the frequency range employed by a parent when conveying the message to another adult is as little as 70 Hz whereas, when speaking to a child, the frequency range increases five fold to 350 Hz.

Another way to think of Motherese is to liken it to the vocalizations that other animals direct to their young. Motherese has interpretable melodies (intonation patterns): a rise-and-fall contour for approving, a set of sharp, staccato bursts for prohibiting, a rise pattern for directing attention, and smooth, low legato murmurs for comforting. In the field of psychology, experts have hypothesised that these patterns are widespread across language communities, and are generally universal. The intonation patterns attract the child's attention, mark the sounds as speech as opposed to stomach growlings or other noises, distinguish statements, questions, and imperatives, delineate major sentence boundaries, and highlight new words.

The present invention proposes the use of sets of discrete tone sequences or continuous analog tones as user feedback audio messages in electrical and electronic apparatuses such as desktop telephones and personal computers, said tones and tone sequences being designed to convey to users of the devices messages in an unambiguous way. The tone sequences are chosen as ones which are innately recognisable to humans and it has surprisingly been found that such tones can convey substantially the same meaning across all languages and cultures.

In implementing the method of the present invention, three important points have been recognised. The first is that all adults instinctively know how to communicate with children employing prosodic patterns that signify the four primary messages. They do not need to be taught what the pattern should be for any given message. The prosodic patterns are innate modes of communication that are instinctively employed by adults when communicating with children and which are innately recognised by children. The second point is that, whilst adults instinctively know how to communicate with children employing prosodic patterns as aforementioned, adults do not lose their ability to cognitively appreciate the prosodic patterns when hearing other adults speak in this way. The third point is that studies of parentese indicate that parents in all regions, cultures and languages of the world use remarkably similar pitch patterns to convey the same primary messages. It has been found that speakers of such diverse languages as English, German, Japanese, Mandarin and Xhosa all employ similar prosodic patterns.

The present invention comprises employing the underlying pitch patterns identified by studies of parentese and converting these to simple continuous tones or tone sequences to be output as audio information signals to users of electrical and electronic devices and systems in response to certain predetermined user interactions with the devices and systems.

Having identified the two key features characterising the primary message prosodic patterns, it is necessary to analyse each of said primary message prosodic patterns in order to relate the features to the patterns.

This allows tone sequences to be developed which are relatively simple to implement and yet retain the innately recognisable message conveyed by the prosodic pattern from which the tone sequence is derived. It has been found that the prosodic patterns of each of the primary messages can be characterised as follows:

1. Attention Generally residing in a higher frequency range with a range that is equivalent to or slightly greater than "approval" regarding mean frequency, with a smoothly varying continuous tone or very brief silence intervals between discrete tones with a fall-rise contour being of medium duration and medium amplitude when compared to the other primary messages.
2. Approval Generally residing in a higher frequency range with a range that is equivalent to or only slightly lower than "attention" regarding mean frequency, with a smoothly varying continuous tone or brief silence intervals between discrete tones with a rise-fall bell shaped contour but of a longer/medium duration and medium amplitude when compared to the other primary messages.
3. Comfort Generally residing in a lower frequency range than either "approval" or "attention" regarding mean frequency, but in a still higher range than "prohibition", with a falling generally linear contour and a medium to loud amplitude.
4. Prohibition Generally residing in a low (lowest when compared to the other primary messages) frequency range with staccato tones, relatively larger silence intervals, a shallow rise fall contour and having a short duration with loud amplitude.

An analysis of the characteristics of each of the primary messages reveals that it is possible to represent each with a minimum of three discrete tones of different frequencies or a continuous tone containing these three different frequencies whilst retaining the underlying innately recognisable prosodic pattern of said messages. It has been found that it is the frequency modulation within the prosodic patterns which is the critical determinant to ensure innate recognition of the audio feedback tones to the user.

FIGS. 1A, C, E and G illustrate by means of frequency time graphs discrete tone sequences respectively representative of the prosodic patterns of the four primary messages. As indicated above, each prosodic pattern is represented by three discrete tones of different frequencies. This has been found to be the minimum number of discrete tones necessary to ensure cognitive salience for humans.

In calculating the frequencies of the discrete tones comprising the various prosodic patterns, it has been found that the following mathematical relationships apply. In each case, X=frequency of tone 1, Y=frequency of tone 2 and Z=frequency of tone 3 as the consecutive tones in the sequence. The relationships are:

1. Approval Z<X<Y and Y−Z<425 Hz;
2. Prohibition X<Z<Y and Y−X<50 Hz;
3. Attention Y<X<Z and Z−Y<330 Hz;
4. Comfort Z<Y<X and X−Z<40 Hz.

In each of FIGS. 1A, C, E and G, the tone having the lowest frequency is provided with an arbitrary value (not the same for the four patterns illustrated although it could be). From the value assigned to the lowest frequency, it is possible to calculate the frequency value of the tone having the highest frequency with the remaining tone being assigned a frequency value lying between the two extremes. Preferably, the frequency value assigned to the tone having the median frequency lies in the central third of the frequency range between the highest and lowest frequencies of the tone sequence.

Figure 1B:
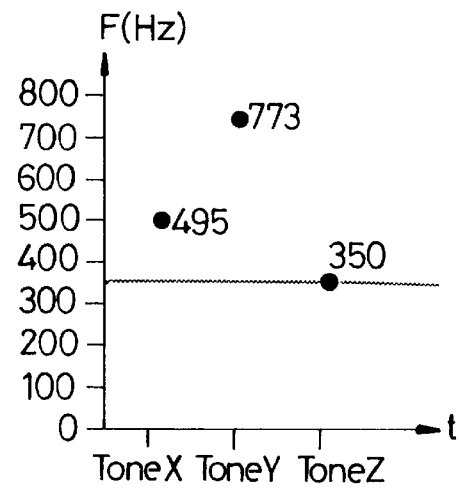
FIG. 1B is a frequency time graph of said first discrete tone sequence with its frequency components shifted to a preferred range.
Figure 1C:
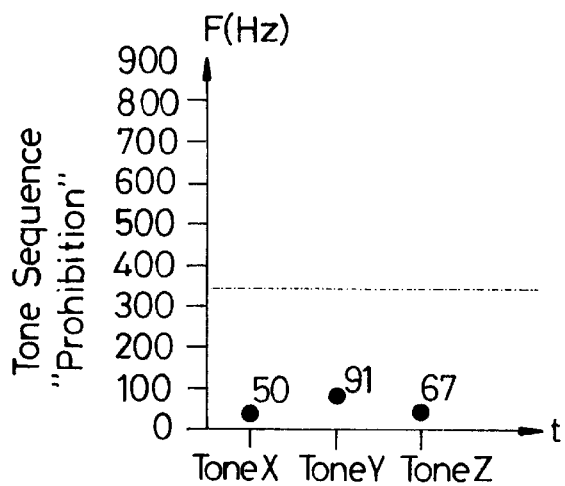
FIG. 1C is a frequency time graph of a second discrete tone sequence encapsulating a second prosodic pattern in accordance with the invention.
Figure 1D:
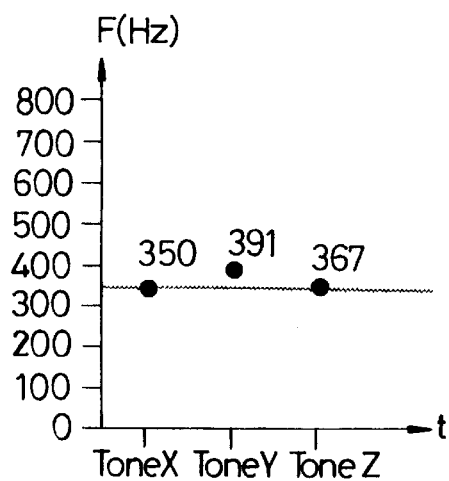
FIG. 1D is a frequency time graph of said second discrete tone sequence with its frequency components shifted to a preferred range.
Figure 1E:
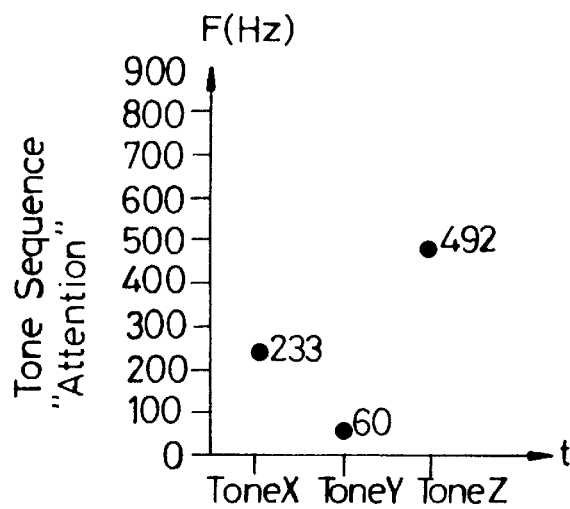
FIG. 1E is a frequency time graph of a third discrete tone sequence encapsulating a third prosodic pattern in accordance with the invention.
Figure 1F:
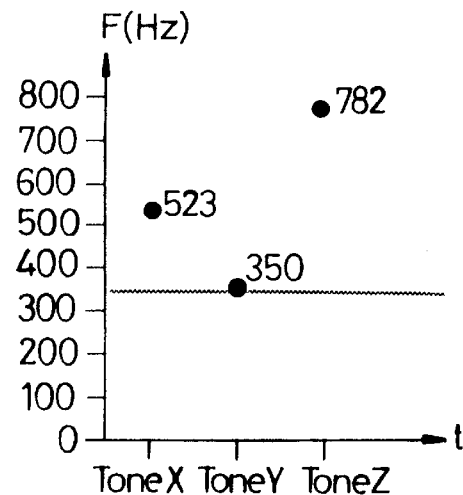
FIG. 1F is a frequency time graph of said third discrete tone sequence with its frequency components shifted to a preferred range.
Figure 1G:
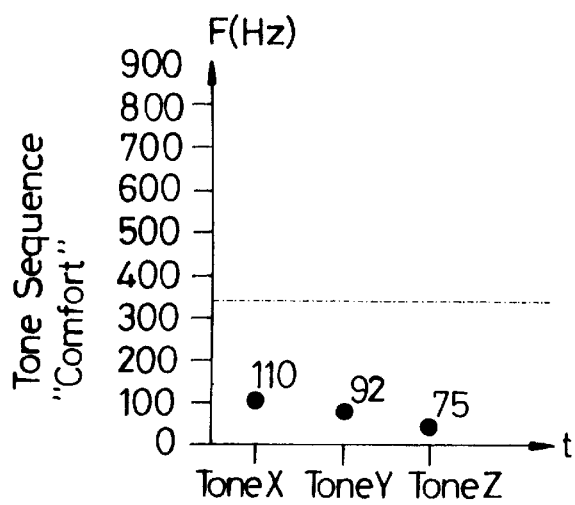
FIG. 1G is a frequency time graph of a fourth discrete tone sequence encapsulating a fourth prosodic pattern in accordance with the invention.
Figure 1H:
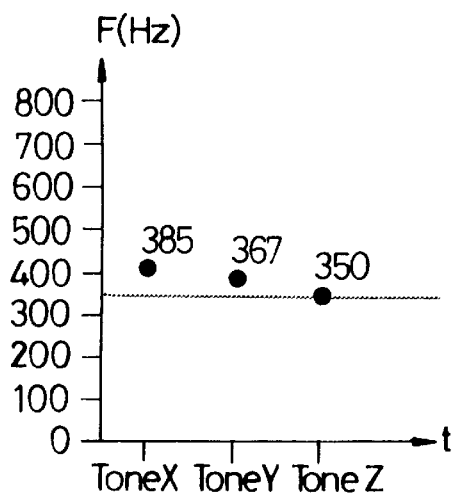
FIG. 1H is a frequency time graph of said fourth discrete tone sequence with its frequency shifted to a preferred range.

Devices employing speaker means to output audio information signals often have an optimum frequency range of operation of 350 Hz to 900 Hz. Consequently, for each of the prosodic patterns, it is envisaged that the frequency spectrum of the pattern will be shifted such that the tone having the lowest frequency coincides with the lower limit of the optimum operating range of the speaker means. In the illustration, this has been set at 350 Hz as illustrated respectively by FIGS. 1B, E, F and H. It will be appreciated that in many applications it will be desirable to represent the primary message prosodic patterns by discrete sequences of tones comprising considerably more than three discrete tones for each pattern. The use of three discrete tones to represent a prosodic pattern is considered a minimum requirement rather than an optimum means of representing the pattern. The duration of each tone and its amplitude (loudness) may be varied to achieve optimum representation of the underlying prosodic pattern and this will be discussed in more detail below.

Figure 2A:
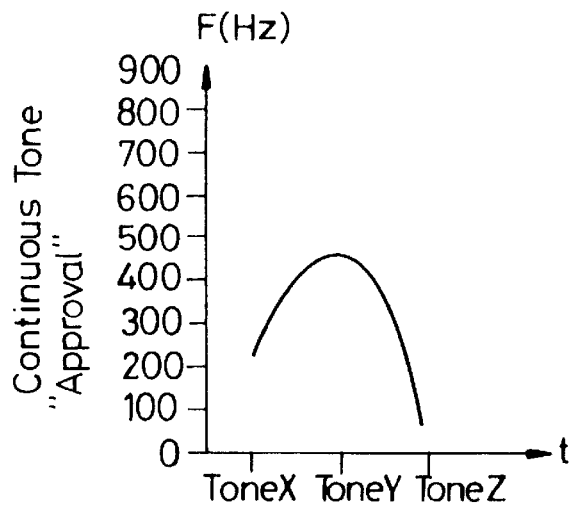
FIG. 2A is a frequency time graph of a continuous tone encapsulating the first prosodic pattern in accordance with the invention.
Figure 2B:
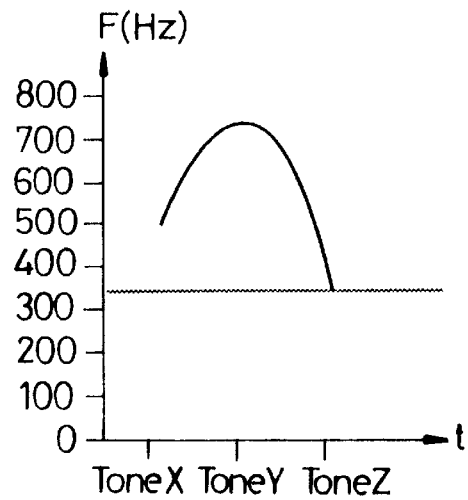
FIG. 2B is a frequency time graph of said first continuous tone with its frequency spectrum shifted to a preferred range.
Figure 2C:
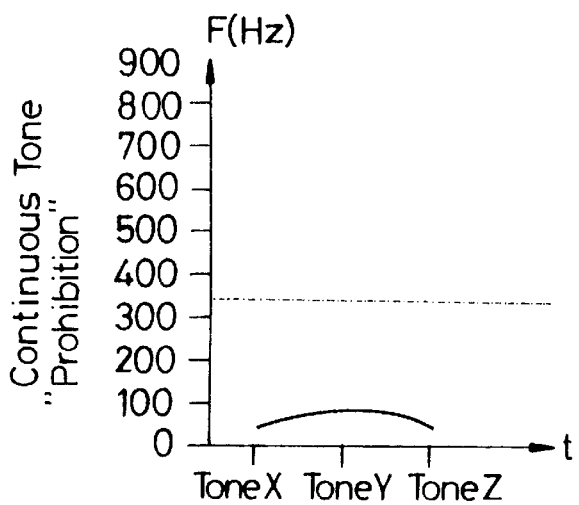
FIG. 2C is a frequency time graph of a second continuous tone encapsulating said second prosodic pattern in accordance with the invention.
Figure 2D:
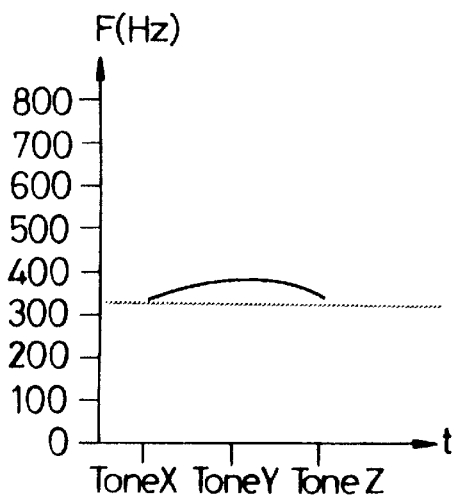
FIG. 2D is a frequency time graph of said second continuous tone with its frequency spectrum shifted to a preferred range.
Figure 2E:
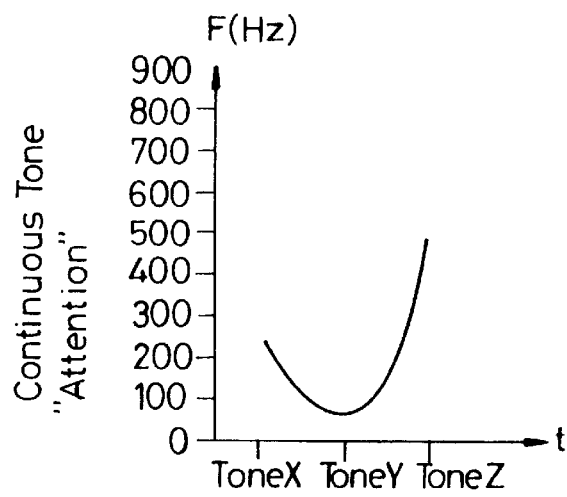
FIG. 2E is a frequency time graph of a third continuous tone encapsulating said third prosodic pattern in accordance with the invention.
Figure 2F:
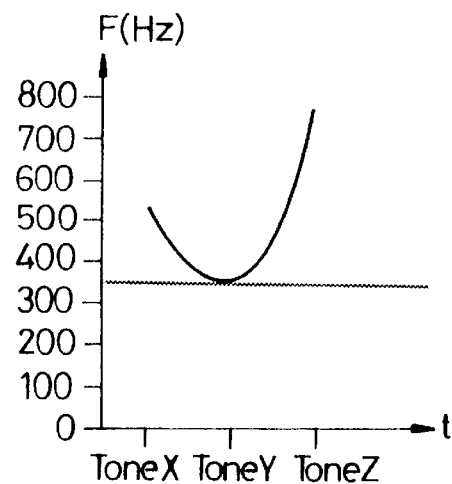
FIG. 2F is a frequency time graph of said third continuous tone with its frequency spectrum shifted to a preferred range.
Figure 2G:
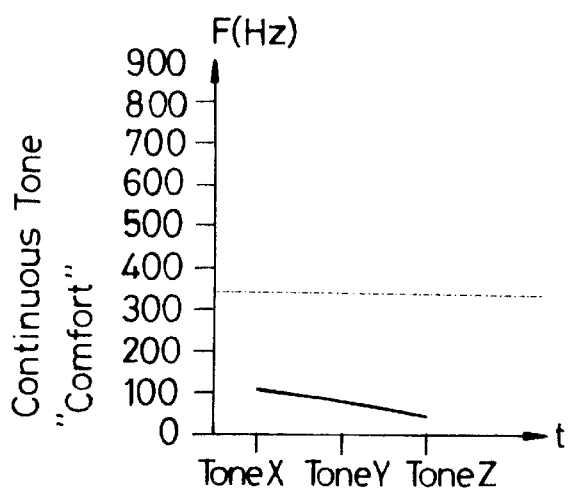
FIG. 2G is a frequency time graph of a fourth continuous tone encapsulating said fourth prosodic pattern according to the invention.
Figure 2H:
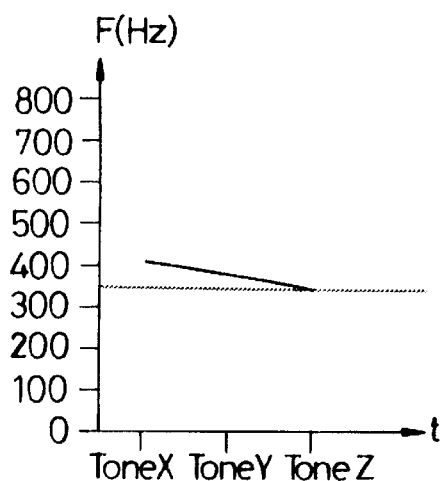
FIG. 2H is a frequency time graph of said fourth continuous tone with its frequency spectrum shifted to a preferred range.

FIGS. 2A, C, E and G illustrate the frequency spectrums for continuous tones representative of the prosodic patterns of the four primary messages. Likewise to the discrete tone sequences, the frequency spectrums have been shifted to have a minimum frequency value of 350 Hz (FIG. 2B, E, F and H). It has been found that such frequency shifts do not compromise the integrity of the innately recognisable message conveyed by the continuous tones. The duration of each continuous tone and its amplitude may, as with the discrete tone sequences, be varied to achieve optimum representation of the underlying prosodic pattern.

Figure 3:
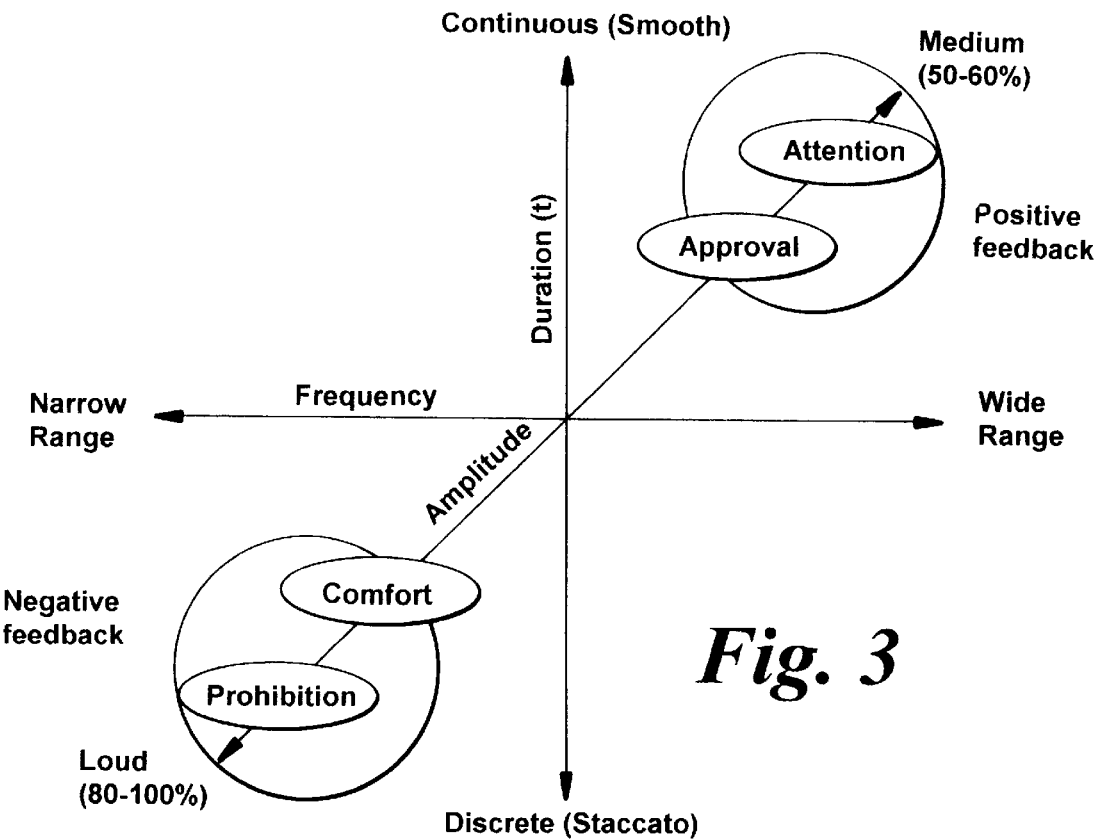
FIG. 3 is a schematic representation of the characteristic elements comprising prosodic patterns according to the invention.

FIG. 3 is a representation of the features characterising the prosodic patterns of the four primary messages in a graphical manner. It will be appreciated that the frequency values presented in FIGS. 1 and 2 are merely illustrative of the frequency components comprising discrete tone sequences and continuous tones embodying prosodic patterns in accordance with the invention.

The horizontal axis of the graph of FIG. 3 provides a relative measure of the frequency bandwidth for the prosodic patterns, illustrating a relatively large bandwidth for both "attention" and "approval" and a narrow bandwidth for "comfort" and "prohibition". It will be seen that within the group of "attention" and "approval", "attention" has a slightly larger bandwidth than "approval" although it is not considered essential that this is always the case. Similarly, it can be seen that "prohibition" has a smaller bandwidth than "comfort".

The vertical axis of the graph of FIG. 3 provides a relative measure of the duration of the tone or tones comprising the prosodic patterns of the primary messages indicating that the tone or tones of both "attention" and "approval" are cumulatively longer than the duration of the tone or tones comprising "comfort" and "prohibition". The upper part of the vertical axis of the graph of FIG. 3 indicates that it is preferable that both "attention" and "approval" comprise a continuous tone whereas the lower part of the vertical axis of said graph indicates that it is preferable that "prohibition" and "comfort" comprise a series of discrete, staccato like tones.

The graph of FIG. 3 also provides an indication of the relative amplitudes, ie loudness, of the tone or tones comprising the various primary messages indicating a preference for "prohibition" to have a relatively large amplitude being in the order of 80 to 100 percent of a set maximum loudness level whereas "attention" has a preferred loudness range of 50 to 60 percent of said set maximum level.

Whilst the prosodic patterns of the primary messages illustrated in FIGS. 1 and 2 suggests that said messages should be all represented by sequences of discrete tones (FIG. 1) or by continuous tones (FIG. 2), it will be appreciated from the graph of FIG. 3 that it is preferred that, when employed as audio feedback messages in an apparatus, the primary messages of "attention" and "approval" are comprised of continuous tones having duration, frequency bandwidth and amplitude characteristics as illustrated in the graph with the primary messages of "comfort" and "prohibition" being comprised of sequences of discrete tones having bandwidth, amplitude and duration characteristics also as illustrated in the graph.

Despite the preferences illustrated by the graph of FIG. 3, the invention is in no way limited to said preferences. It is envisaged that, in an apparatus employing user feedback audio signals in accordance with the invention and including both audio signals representative of "attention" and "approval", one of these two messages will be comprised of a continuous tone whilst the other will be chosen to be comprised of a sequence of discrete tones. This may be desirable given the similarity of the patterns, one generally comprising the inverse of the other.

An audio signal encapsulating a prosodic pattern recognisable to humans contains sufficient information to convey the underlying speech rhythms of a speech signal but insufficient information to convey the speech signal itself in a way that would render the speech signal (i.e. its component words) recognisable. The information used to convey the underlying speech rhythms of a speech signal and which can thus constitute the prosodic pattern for such speech signal comprise mean frequency components extracted at intervals from the speech signal.

Figure 4:
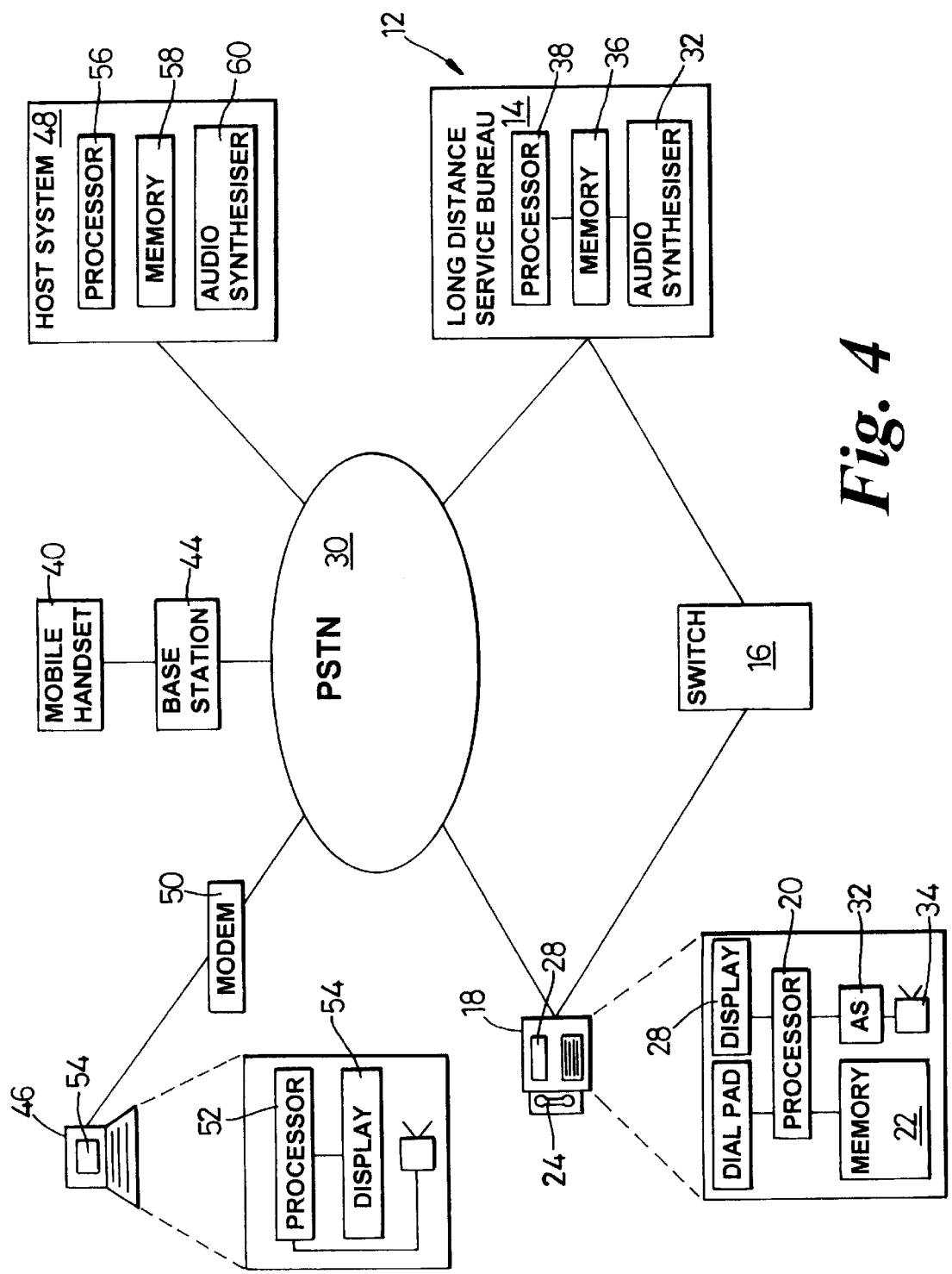
FIG. 4 is a schematic diagram of a telecommunications network containing telecommunications equipment consistent with the invention.

FIG. 4 is a schematic representation of a telecommunications network 10 in accordance with the invention. The network includes a subscriber service system 12 such as a long distance service bureau 14 as disclosed in applicant's co-pending U.S. patent application Ser. No. 08/797,244, the content of which is incorporated herein by way of reference. Subscribers communicate with the long distance service bureau 14 via a local end office/PBX switch, such as switch 16.

For simplicity purposes only, FIG. 1 shows a single subscriber who has an analog display services interface (ADSI) compatible telephone 18. ADSI compatible telephone has an internal processor 20 and memory 22, handset 24, dial pad 26 and visual display 28. A conventional ADSI compatible telephone is described in U.S. Pat. No. 5,416,831 issued to Chewning, III et al. ADSI compatible telephone 18 connects to the switch 16 using a conventional ADSI connection, typically a bi-directional protocol based upon dual tone multiple frequency (DTFM) and Bell 202 modem signalling. The switch connects to the long distance service bureau using a T1_UTT connection.

Alternatively, and consistent with the invention, the subscriber connects to the long distance service bureau 12 via a telecommunications network, such as a public switched telephone network (PTSN) 30, by conventional means common in the art.

In a first embodiment employing an ADSI compatible telephone 18, as more fully described in applicant's co-pending application, the long distance service bureau 14 communicates with the ADSI telephone 18 whilst it is on hook to store in its memory 22 a rate table of tolls for various long distance carriers. This data can be utilised by the subscriber to determine which of the long distance carriers to place a long distance call with based on criteria such as toll rate, quality of service, etc. When placing a telephone call, the subscriber lifts ADSI telephone handset 24 and dials a telephone number using the dial pad 26. ADSI telephone processor 20 detects the dialled digits and determines whether the subscriber has dialled a local or a long distance telephone number. In the case that a local number is detected, the processor routes the call on the local carrier. However, if the subscriber has dialled a long distance telephone number, the processor determines, based on some of the digits of the number, the called zone and then determines which long distance service carriers serve this zone. In preparing the rate table, it is a function of the long distance service bureau to poll long distance carriers not only on toll charges but also on zones served and other special service features such as discounted toll rates for specified periods. The processor 20 presents to the subscriber a list of relevant long distance carriers to enable the subscriber to select an appropriate long distance carrier for the intended call. The processor 20 displays on ADSI telephone visual display 28 the available long distance carriers and corresponding information. Based on this information the subscriber can select a carrier for placing the call. On choosing a carrier, the processor 20 then routes the call on the selected carrier.

The subscriber can select one of a presented list of long distance carriers by means of programmed soft keys (not shown) or by means of entering a numerical identifier via the dial pad 26. On entry of a numerical identifier corresponding to one of the listed carriers, the processor 20 accepts the numerical identifier and proceeds to route the call on the chosen long distance carrier. In association with this, the processor 20 having recognised that the numerical identifier entered by the subscriber is one of those displayed in the rate list, retrieves from memory 22 an audio message stored in digitised form, said message being chosen as being one which embodies the prosodic pattern of "approval". Said digitised audio signal is passed to an audio synthesiser 32 mounted within the ADSI telephone 18 which converts the signal to audio form for outputting as a user feedback audio message on a speaker 34 also mounted in the telephone 18. The outputting of the signal confirms to the subscriber that the numerical identifier entered has been accepted and that the long distance call is in the process of being routed on the chosen long distance carrier. The subscriber will innately recognise the "approval" message audio signal without having been repetitively exposed to it. The audio synthesiser 32 and speaker 34 may be stand alone items connected to the telephone 18 by suitable jacks.

In the event that the subscriber enters an incorrect numerical identifier (or presses the wrong soft key), the processor 20 on comparing the numerical identifier with those of the displayed long distance service carriers will recognise that the subscriber input data is in error and will request that the subscriber tries again. In association with this step, the processor 20 retrieves from the memory 22 a digitised audio signal embodying the prosodic pattern of "attention" and in a similar manner to the process described above, outputs the audio signal to the subscriber on the speaker 34. The subscriber will innately recognise the message embodied in the audio signal and will re-enter the numerical identifier. By using an audio feedback signal as described above, it may not be necessary to output a textual message on the telephone display 28 although it may be preferred to do this. An advantage of employing only an audio feedback signal as described is that the displayed rate table for the long distance service carriers can be maintained, without interruption, on the display 28. The step of outputting the audio signal of "attention" may be repeated until such time as the user inputs an acceptable numerical identifier at which point the audio message of "approval" will then be outputted. Alternatively, after a predetermined number of incorrect entry attempts by the subscriber, the processor may end the transaction with the subscriber by outputting the audio signal embodying the message "prohibition" to cause the subscriber to return the handset 24 to the telephone 18 and repeat the entirety of the procedure.

In the system described in applicant's co-pending application, the subscriber initially establishes preference data upon which the rate table communicated to the subscriber's telephone by the long distance service bureau 14 is set. Consequently, where the subscriber changes preferences, it is necessary to communicate the changed preferences to the long distance service bureau 14 in order that future rate table updates downloaded by the long distance service bureau 14 to the subscriber's telephone 18 take account of the changed preferences. However, where a subscriber wishes to maintain in general his indicated preferences, but wishes to prevent another user of the telephone 18 from utilising a particular long distance service carrier because of high toll charge rate, for example, but where the subscriber utilises this carrier because of quality of service reasons, the subscriber may program the processor 20 with a further numerical identifier which must be entered in addition to the displayed numerical identifier for that long distance service carrier in order to enable a long distance call to be routed via that carrier. Consequently, when another user attempts to place a long distance call via the selected carrier, on entering only the displayed numerical identifier which would normally provide access to said carrier, the processor 20 recognises that said carrier is barred to users not also inputting the further numerical identifier and, in the absence of said further numerical identifier, causes the "prohibition" message to be output on the speaker 34 indicating to the user that they cannot make the long distance call on said selected carrier. After one or more unsuccessful attempts to access the barred long distance carrier without inputting the further numerical identifier, the processor 20 may prevent any long distance calls being routed on the telephone 18 until such time as the further numerical identifier is inputted to reset the telephone. It is envisaged that this feature of the invention will have particular application in domestic situations to enable parents to restrict use by their children of the telephone set 18 to make long distance calls. The processor 20 may be programmable so as to prevent any long distance call being made without inputting the further numerical identifier with any attempt to place a long distance call without inputting said further numerical identifier being met with the handset outputting the audio "prohibition" signal.

In a second embodiment as described in applicant's co-pending application, the subscriber connects to long distance service bureau 18 via a telecommunications network, such as a public switch telephone network (PSTN) 30 by conventional means. Rate table data for long distance service carriers based on the subscriber's preferences is stored in memory 36 of the long distance service bureau 14. The long distance service bureau 14 includes a large capacity memory device, such as a disc array for storing such information for various subscribers.

When placing a long distance call, the subscriber accesses the long distance service bureau 14 by dialling a special toll free number. Alternatively, the subscriber could set up the ADSI telephone 18 to automatically connect to the long distance service bureau 14, which is useful for voice activated dialling. The service bureau 14 queries the subscriber for the subscriber's caller identity number (ID) so that the service bureau 14 can retrieve the subscriber's rate table data from memory 36. In this embodiment, processor 38 of the service bureau compares the ID input by a user of the telephone 18 with the subscriber's ID stored in its memory 36. In the event that the inputted ID matches the subscriber ID, the processor 38 retrieves from memory 36 an audio signal embodying the message "approval" and transmits this to the subscriber. The audio message is stored in the service bureau's memory 36 in digitised form and may be communicated in this form to the subscriber telephone whereat the audio synthesiser 32 converts the signal to audio format for outputting on the telephone speaker 34. Alternatively, the audio synthesiser 32 may be located in the service bureau 18 and may convert the digitised audio signal to an audio format for transmission by conventional means. One advantage of this arrangement is that an audio synthesiser would be required in only the service bureau 14 rather than one in each of the subscribers' telephones 18. In a similar manner to the first embodiment, the incorrect inputting of the subscriber's ID detected by the processor 38 will result in the processor 38 causing an audio signal embodying the message "attention" to be transmitted to the subscriber for outputting on his telephone speaker 34. Similarly, after a series of failed attempts to enter the correct subscriber ID, the processor 38 of the service bureau 14 will cause the audio message of "prohibition" to be transmitted to the subscriber and the connection with the subscriber to be discontinued. It will be appreciated that the use of numerical identifiers to restrict access to certain long distance carriers can be employed in a like manner to the first embodiment.

FIG. 4 also indicates that other devices may be connected to the telecommunications network to communicate with the long distance service bureau 14 and to each other and, in other arrangements, the long distance service bureau 14 may be replaced by some other form of subscriber service system 12. In a similar manner to the ADSI telephone 18 as described above, any suitable telephone set could be arranged to utilise the present invention including mobile telephone handsets 40 communicating via wireless links 42 with base stations 44 connected into the PSTN 30.

Also shown in FIG. 4 is a computer 46 such as a personal computer which connects with a host system 48 across the telecommunications network 10. The computer 46 communicates via modem 50 across the PSTN 30. The computer 46 comprises a processor 52 and a display 54. The modem 50 may be a plug-in device within the computer 46 but could be a free standing unit. In either case, the modem 50 communicates with processor 52 via a serial interface. The modem 50 may be one of the many commercially available modems that are well known in the art. The host computer system 48 comprises processor 56, audio synthesiser 60 and memory unit 58. Host processor 56 might also be a personal computer or it may be a special purpose processor dedicated to a specific task. The audio synthesiser 60 is preferably a commercially available plug-in device commonly known as a voice card. Such a device is capable of receiving digitised voice or other sound data and generating therefrom an analog signal which, when applied to a speaker, produces a synthesisered sound. The synthesiserer 60 not only converts digitised audio data into analog audio signals, but is capable of receiving dual tone multiple frequency (DTMF) signals across the PSTN 30 and converting such signals into digital data. Consequently, two way communication can be established between the modem 50 and synthesiserer 60 with digital data being sent from the modem 50 to the synthesiserer 60 and audio signals being sent in a reverse direction.

In operation, a user employs processor 52 to execute an application program. This may include application programs of an interactive nature which requires a user to input data to the computer 46. The present invention provides a user with feedback audio signals that are dependent on user input data to the computer 46. For example, the application program may be an educational program which requires the user to enter answers or make selections from multiple choices of answers. In the case where the user inputs certain data, the computer 46 issues a conventional telecommunications command to modem 50 to establish communications with the host system processor 56. Once the telephone connection between the modem 50 and the host system processor 56 is established, modem 50 remains in a command mode. Host processor 56 is programmed to support the application program being run on the computer 46. Host processor 56 may be programmed to support any number of application programs. As the user interacts with the computer 46 entering data in response to displayed questions under the control of the processor 52, an audio message command is sent to modem 50 containing a digital word which is chosen dependent on an assessment of the input data by processor 52. For example, where a question displayed to a user of the computer is of a quantitative nature having only correct or incorrect answers, the digital command is chosen as indicating whether the user input data establishes a correct answer or has failed to do so. The digital command will be associated with an audio signal having the prosodic pattern of "approval" or "comfort", as appropriate. Alternatively, the questions displayed to the user of the computer may be of a qualitative nature where the user responses are considered as falling within a range of good to bad and consequently the digital command associated therewith may be chosen from a plurality of such commands, said commands being associated as appropriate with the audio messages of "approval", "attention" and "comfort".

When an audio message command is sent to modem 50 from the computer 46 containing a digital word associated with processor's 52 assessment of the user input data, the audio message command is converted by modem 50 to a corresponding DTFM signal which is transmitted to the host system 48. On receiving the digital command in its DTMF format, the host system synthesiserer 60 converts the DTMF signal into a digital word identifying the particular audio signal requested by the computer 46. This digital word is sent to host system processor 56 which then retrieves the corresponding digitised message from memory 58. This digitised message is then applied to the synthesiserer 60 which converts it to an analog audio signal corresponding to the digitised data. The audio signal is transmitted to the computer 46 where it is outputted on the modem speaker (not shown) or alternatively on a speaker 62 of the computer 46.

It will be appreciated that the foregoing description of computer 46 executing an education program is merely illustrative of one way in which the method of the invention can be employed with computers connectable to a telecommunications network.

Figure 5:
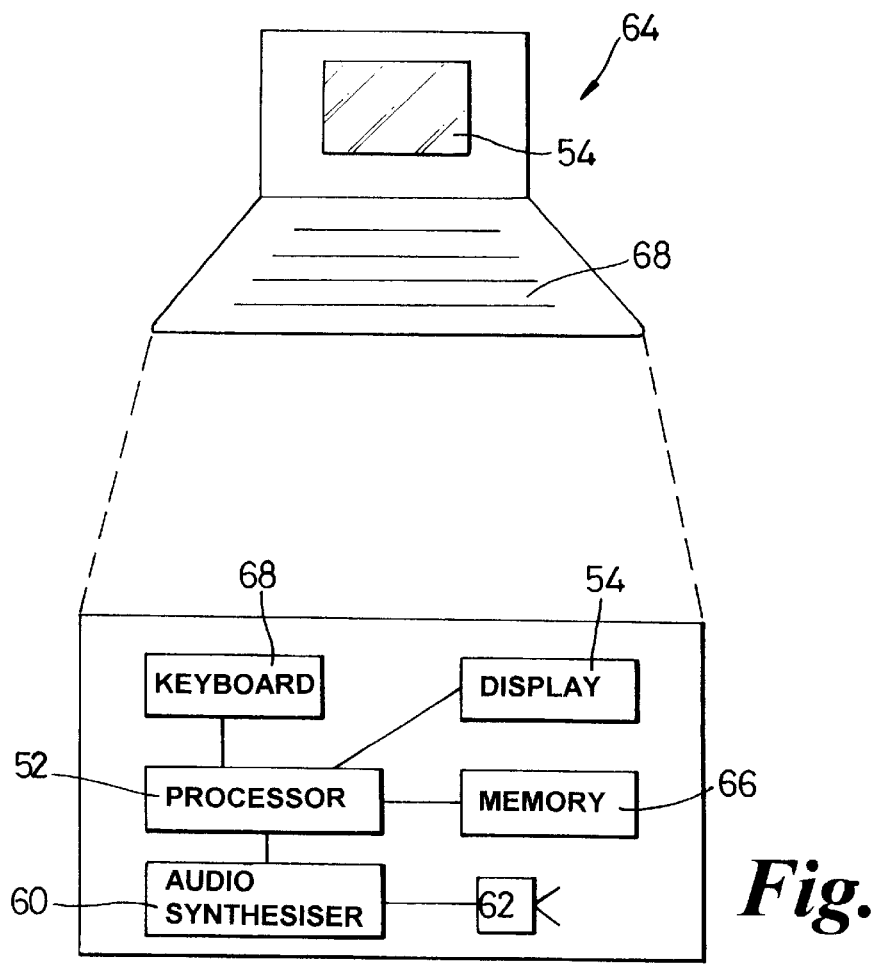
FIG. 5 is a schematic diagram of a personal computer consistent with the invention.

FIG. 5 is a schematic representation of a personal computer 64 consistent with the invention. This has a structure which is generally identical to that of the computer 46 as illustrated in FIG. 4 and consequently like numerals are utilised to denote like parts. However, the personal computer 64 as illustrated in FIG. 5 is shown as a stand alone unit but it will be appreciated that this computer can be connected to a communications network in a conventional manner by a modem. The characteristic feature of the structure of the personal computer 64 illustrated in FIG. 5 is that all communication between the processor 52 and audio synthesiserer 60 is conducted internally of the apparatus, the apparatus having in addition to the processor 52 a memory 66 containing audio signals in digitised format, said processor 52 controlling the memory 66 and speaker 62 for outputting said signals. The audio synthesiserer 60 converts the digitised audio signals stored in the memory 66 into an audio format for outputting on the speaker 62. This apparatus employs audio signals encapsulating prosodic patterns which are recognisable to humans in a manner consistent with other embodiments of the invention. In addition to a keyboard 68 for inputting user data, the apparatus of this embodiment may employ a touch sensitive screen or voice recognition means to allow users to input data in interaction with the computer executing application software of an interactive nature.

Figure 6:
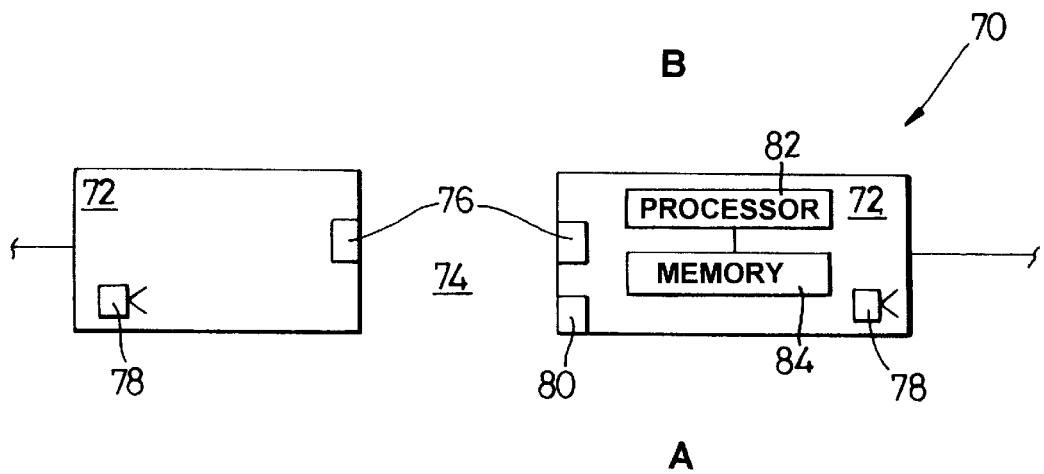
FIG. 6 is a schematic plan view of a security gateway consistent with the invention.

FIG. 6 is a schematic plan view of a security gateway or barrier 70 which is intended to control access by persons from a publicly accessible area A to a protected area B. Such gateways are common in public buildings to deny the public access to staff only areas and are also employed in private buildings to which the public has limited access.

The security gateway comprises barriers 72 having an opening 74 through which users may pass to gain access to the protected area B. The barriers 72 comprising the gateway include sensors 76 to detect persons passing through the opening 74 and speakers 78 to emit audio information signals such as user feedback signals and alert signals. On at least one of the barriers 72 comprising the gateway, is a user input data means such as a magnetic chip/strip card reader 80 to enable authorised users to pass through the gateway without triggering a security alert. In use, a user inserts or swipes their card through the card reader in a conventional manner and, on acceptance, the user is authorised to pass through the gateway during a preset time during which no alert will be triggered by the gateway. In the context of the present invention, the security gateway will include a processor 82 for processing user identity data read from the user's ID card and memory means 84 storing authorised user IDs. Also stored in the memory means 84 are digitised audio signals encapsulating prosodic patterns in accordance with the invention.

In operation, a user swipes his card through the card reader 80. The card reader 80 reads the user ID data from the card as it is being swiped and passes this to the processor 82. The processor 82 checks the user's ID against stored ID data and, if a match is found, retrieves from the memory an audio signal encapsulating the prosodic pattern of "approval". The processor 82 controls the memory means 84 to communicate the retrieved digitised audio signal to a synthesiserer 86 which converts it to an audio signal for outputting on the speakers 78. On hearing this signal, a user innately understands that his card transaction with the security gateway has been accepted and he passes quickly through the gateway to the protected area B. However, should the card reader 80 fail to read the user's ID data from the user's ID card as it is being swiped for reasons which are well known, such as the card being swiped too quickly or not properly inserted in the card reader, the processor 82 controls the memory means 84 to retrieve a digitised audio signal encapsulating the prosodic pattern of "attention" which it will cause to be outputted on the gateway speakers 78 to inform the user that he must not enter through the security gateway but must again swipe his card through the reader 80. The processor 82 may be programmed to repeat this process for a predetermined number of failed card reading attempts after which an audio signal encapsulating the prosodic pattern of "prohibition" will be outputted to indicate to the user that he should seek assistance and is denied access through the gateway. On further attempts by the user to swipe the card, the processor 82 will control the memory 84 to retrieve, in succession, the audio signal encapsulating the "prohibition" message followed by the audio signal encapsulating the "comfort", ie "sorry", message to be outputted to the user to confirm denial of access and to encourage the user to seek assistance.

It will be appreciated that the particular arrangement of the security gateway described in the foregoing embodiment is merely illustrative of a security gateway employing the method of the invention. The present invention employing user feedback audio signals encapsulating prosodic patterns recognisable to humans and conveying primary messages as aforesaid can be employed in any security gateway fulfilling the same function but of different formats and structures to the aforesaid.

Figure 7:
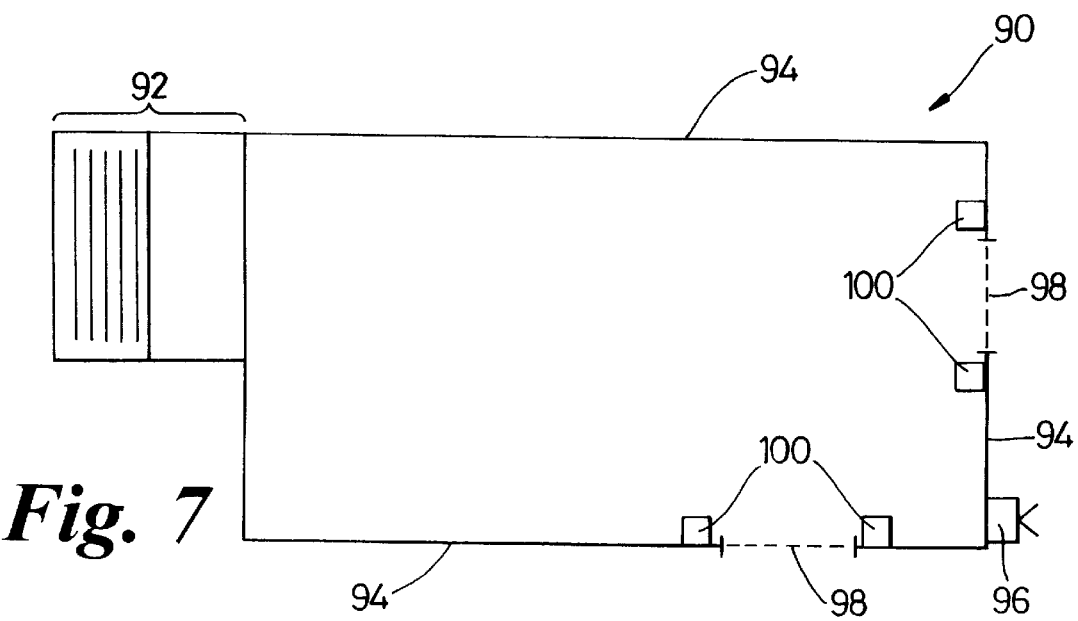
FIG. 7 is a schematic plan view of a manufacturing plant consistent with the invention.

FIG. 7 is a schematic plan view of a manufacturing plant 90 in which a user controls manufacturing processors via various interaction means on a console panel 92. The manufacturing plant 90 is contained within safety guard fences 94 to prevent access while the plant is in operation. The guard fence 94 has at least one speaker 96 mounted thereon although a number of speakers may be distributed around the fence 94. In order to gain access to the guarded area of the manufacturing plant, the user must close down processing operations via the console panel 92. In the event that a user attempts to gain access to the guarded area via any access point 98 in the fence 94 without first stopping manufacturing processes, sensors 100, such as proximity detectors, arranged at the access points will, if activated, cause an emergency shut down of the manufacturing processes and cause an audio signal to be outputted on the speaker(s) 96, said audio signal encapsulating the prosodic pattern of "prohibition". Other audio messages encapsulating prosodic patterns as aforedescribed could be employed in association with other user interactions with the apparatus.

In all of the embodiments of the invention, the duration and amplitude of the continuous tones or sequences of discrete tones comprising the audio signals can be varied to provide an optimum effect.

In the case of the duration(s) of the tones, since the salience of the prosodic patterns of the audio signals is dependent on frequency modulation, temporal duration of the tone or tones comprising the patterns can be varied either between tone sequence patterns within a set of patterns or within the tone sequence patterns themselves while still retaining their innate cognitive effect.

The duration for a continuous tone or discrete tone sequence can be related to the message which the prosodic pattern of the continuous tone or tone sequence is attempting to convey to the user. For example, start up and shut down tone sequences which indicate a significant state change in an apparatus are traditionally longer in duration than "in operation" messages, which occur during a task being performed by a user.

A start up audio signal which communicates "ready and active" ("approval") to a user should be of longer duration than an audio signal used at the end of a task to indicate a message such as "input accepted" ("approval"). The positive primary message of "attention" illustrated in the graphical manner in FIG. 3 generally has a longer duration than the primary message of "approval" but the difference in duration can be made much greater than that illustrated in FIG. 3 to account for different statuses of messages as described above.

Table 1 below sets out durations for the tones and tone sequences comprising the primary messages for use in mobile telephone handsets and desk top telephones by way of example. The duration of each audio signal in accordance with the invention is selected from one of short, medium and long duration:

TABLE 1

|  | Discrete tones Attack/Decay 5 ms ea. tone | | Continuous (scalar) tones Attack/Decay 5 ms |
| --- | --- | --- | --- |
| Short duration (1.0 sec) | Tone X | 26 ms | Tone X, Y, Z |
|  | Silence | 11 ms | 33.3 ms × 3 |
|  | Tone Y | 26 ms | with |
|  | Silence | 11 ms | no silence intervals |
|  | Tone Z | 26 ms | |
| Medium duration (1.5 sec) | Tone X | 40 ms | Tone X, Y, Z |
|  | Silence | 15 ms | 50 ms × 3 |
|  | Tone Y | 40 ms | with |
|  | Silence | 15 ms | no silence intervals |
|  | Tone Z | 40 ms | |
| Long duration (2.0 sec) | Tone X | 53 ms | Tone X, Y, Z |
|  | Silence | 20.5 ms | 66.7 ms × 3 |
|  | Tone Y | 53 ms | with |
|  | Silence | 20.5 ms | no silence intervals |
|  | Tone Z | 53 ms | |

Table 2 sets out a preferred set of durations for the audio signals embodying primary messages in accordance with the invention:

TABLE 2

|  | Mixed duration (1.0–2.0 sec) Attack/Decay 5 ms ea. Tone | | | |
| --- | --- | --- | --- | --- |
| Prosodic Pattern Total Duration | Attention 2.0 sec | Approval 1.5 sec | Comfort 1.5 sec | Prohibition 1.0 sec |
| Tone X | 53 ms | 40 ms | 40 ms | 26 ms |
| Silence | 20.5 ms | 15 ms | 15 ms | 11 ms |
| Tone Y | 53 ms | 40 ms | 40 ms | 26 ms |
| Silence | 20.5 ms | 15 ms | 15 ms | 11 ms |
| Tone Z | 53 ms | 40 ms | 40 ms | 26 ms |

The duration of the continuous tones or tone sequences may also be varied having regard to the target audience. For educational software programs to be executed on personal computers, for example, the target group may be children and consequently, since infant directed speech is elongated, the tone sequences should be of longer duration than would be the case for adult directed speech.

The amplitude, ie loudness, of continuous tones may be varied during the period of the tone since such variations will not compromise the integrity of the prosodic patterns embodied in the tones. Similarly, for discrete tone sequences, the tones comprising the sequences can likewise have varying amplitudes. Variations on amplitude within the prosodic patterns may act to culturally optimise the auditory feedback on a particular device for a particular geographical region.

The foregoing description has concentrated on proposing audio feedback signals embodying prosodic patterns for the four primary messages as aforesaid. However, in an apparatus in which the number of different ways in which a user can interact with the apparatus is greater than four, it is possible to create subsets of the primary messages, each message of each subset embodying the underlying characteristics of the primary message which is the subject of that set but in which the durations of the tones comprising the subset messages, the loudness of the tones comprising the subset messages and the format in terms of continuous tone or discrete tones comprising the subset messages can be varied to provide a wide range of user feedback messages in each subset. In an apparatus having a large number of user interaction features requiring separately tailored feedback messages, a method of establishing subsets might comprise the steps listed below leading to the message subsets(by way of example) set out in table 3.

Steps

1. Identify the user interaction features on the device and information which needs to be communicated to the user but which can be accompanied by or represented by an audio output signal.
2. Categorise the messages as Positive or Negative. Identify the range of messages within the Positive and Negative categories and prioritise by strength (eg strong positive="Attention", weak positive="Approval", strong negative="Prohibition", weak negative="Comfort".
3. Determine tone frequencies for each primary structure using the aforesaid mathematical relationships.
4. Determine appropriate durations for each message, depending on message type (positive or negative), message meaning (strong positive or weak positive) and tone generation constraints on the device (eg mobile phones 1–2 seconds).
5. Vary amplitude of tones to correspond with positive or negative message types or for regional optimisation.

TABLE 3

Attention (Strong Positive)

Please re-enter data
New Message has arrived
New information has arrived
System status has changed
Additional input required to proceed
Starting up now
Turning off now
Listen Approval (Medium to Weak Positive)

Affirmative
Ok
Ready
Yes
Good job
Well done
Correct match
Input accepted
Battery charged
Task completed Comfort (Weak Negative)

Sorry, try again
Oops!
Almost correct
Minor error
Excuse me
No match
Unsuccessful action TABLE 3-continued Incomplete input
Low signal strength
Weak battery
Missing data
Prohibition (Strong Negative)

Don't do that
Stop
Error
Fault occurred
Transmission failure
Inappropriate selection
Wrong
Connection failure
Battery dead
Input rejected Since the prosodic structure (embodied as frequency modulation) or "shape" of each tone sequence pattern category determines cognitive relevance, pitch range can vary to accommodate the generation of an array of acceptable patterns which echo the pattern structure but which reside within different frequency ranges. For example—within a single device application, both a "Ready" sound and in "Input accepted" sound may be required. Both sounds would emulate the prosodic structure (shape) of the "approval" pattern but would be defined within a different pitch range. Duration of the different tone sequences and amplitudes (both inter-pattern and intra-pattern) may also vary to differentiate the unique nature of different auditory feedback messages.

What is claimed is:

1. An electrical/electronic apparatus, comprising:
   user interaction means to enable a user to interact with the apparatus;
   an audio signal outputting means controlled to output an audio signal in association with a user interaction with the apparatus, wherein said outputted audio signal encapsulates a prosodic pattern recognizable to humans, said signal comprising a small number of tones sufficient to convey to the user only said prosodic pattern.

2. An apparatus as claimed in claim 1, wherein said prosodic pattern of said outputted audio signal is selected as being one which is innately recognisable to humans.

3. An apparatus as claimed in claim 1, wherein said prosodic pattern of the outputted audio signal signifies a primary message consisting of one of "approval", "prohibition", "comfort" and "attention".

4. An apparatus as claimed in claim 3, wherein an audio signal to be outputted by the audio signal outputting means is selected from a plurality of such signals, each such signal having a prosodic pattern chosen to signify a respective one of the primary messages.

5. An apparatus as claimed in claim 1, wherein the prosodic pattern of the outputted audio signal comprises mean frequency components extracted at intervals from a corresponding speech signal.

6. An apparatus as claimed in claim 5, wherein the prosodic pattern of the outputted audio signal comprises tones of at least three frequencies.

7. An apparatus as claimed claim 1, wherein the frequency bandwidth of the outputted audio signal is controlled to be substantially equal to the optimum audio operating range of the audio signal outputting means.

8. An apparatus as claimed in claim 7, wherein the lowest frequency of the outputted audio signal is set to be greater than the lower frequency limit of the optimum audio operating range of the audio signal outputting means.

9. An apparatus as claimed in claim 7, wherein, of tones delimiting start, intermediate and end points of the outputted audio signal with respect to time, the tone not having the highest or lowest frequency has a frequency selected as lying in a central third of the frequency bandwidth of the audio signal.

10. An apparatus as claimed in claim 1, wherein the user interaction means comprises at least one of a keyboard, a dial pad, a touch sensitive screen, memory keys, voice recognition means and a magnetic strip/chip card reader to enable the user to input data to the apparatus.

11. An apparatus as claimed in claim 10, wherein it includes processor means for processing user input data in conformance with application software executable by the processor means, whereby said processor means initiates outputting of the audio signal dependent upon the result of the processing of user input data.

12. An apparatus as claimed in claim 11, wherein said apparatus includes a medium for storing the audio message.

13. An apparatus as claimed in claim 12, wherein the audio signal is stored in a memory means in digitised form and an audio synthesiser means is provided for converting said digitised audio signal into an audio form for outputting by the audio outputting means.

14. An apparatus as claimed in claim 13, wherein it comprises a first device embodying the user interaction means, the audio signal outputting means and the (first) processor means and a second device embodying an audio signal memory means and having a second processor means, said first and second devices being linked by a communication means, the arrangement being such that, in response to a predetermined user interaction with the first device, the first processor means communicates a command to the second device over the communications link and on receipt of said command the second processor means controls the memory means to retrieve a selected audio signal, said second processor means communicating said selected audio signal back to the first device for outputting on the audio signal outputting means.

15. An apparatus as claimed in claim 14, wherein the second device includes an audio synthesiser means, said selected audio signal being retrieved from the memory means in a digitised format and being converted by the synthesiser means to an audio format for communication to the first device.

16. An apparatus as claimed in claim 14, wherein the first device communicates the command to the second device over the communications link by DTMF tones.

17. An apparatus as claimed in claim 14, wherein said first and second devices comprise a selection from a desktop telephone, a mobile telephone handset, a computer and a telephone subscriber service system.

18. An electrical/electronic apparatus, comprising:
   user interaction means to enable a user to interact with the apparatus;
   audio signal outputting means controlled to output an audio signal in association with a user interaction with the apparatus, wherein said outputted audio signal encapsulates a prosodic pattern innately recognizable to humans, said prosodic pattern comprising mean frequency components extracted at intervals from a corresponding speech signal said signal comprising a small number of tones sufficient to convey to the user only said prosodic patterns.

19. An apparatus as claimed in claim 18, wherein the prosodic pattern of the outputted audio signal signifies a primary message consisting of one of "approval", "prohibition", "comfort" and "attention".

20. An apparatus as claimed in claim 19, wherein an audio signal to be outputted by the apparatus is selected from a plurality of such signals, each such signal having a prosodic pattern chosen to signify a respective one of the primary messages.

21. An apparatus as claimed in claim 18, wherein the prosodic pattern of the outputted audio signal comprises tones of at least three frequencies.

22. An apparatus as claimed in claim 18, wherein the frequency bandwidth of the outputted audio signal is chosen to be substantially equal to the optimum audio operating range of the audio signal outputting means.

23. An apparatus as claimed in claim 22, wherein the lowest frequency of the outputted audio signal is set to be greater than the lower frequency limit of the optimum audio operating range of the audio signal outputting means.

24. An apparatus as claimed in claim 22, wherein, of tones delimiting start, intermediate and end points of the outputted audio signal with respect to time, the tone not having the highest or lowest frequency has a frequency chosen to lie in a central third of the frequency bandwidth of the audio signal.

25. An apparatus as claimed in claim 18, wherein the user interaction means comprises at least one of a keyboard, a dial pad, a touch sensitive screen, memory keys, voice recognition means and a magnetic strip/chip card reader to enable a user to input data to the apparatus.

26. An apparatus as claimed in claim 25, wherein it includes processor means for processing user input data in conformance with application software executable by the processor means, whereby said processor means initiates outputting of a selected audio signal dependent upon the result of the processing of said user input data.

27. An apparatus as claimed in claim 18, wherein said apparatus includes a medium for storing the audio message.

28. An apparatus as claimed in claim 27, wherein the audio signal is stored in a memory means in digitised form and an audio synthesiser means is provided for converting said digitised audio signal into an audio form for outputting by the audio outputting means.

29. An apparatus as claimed in claim 28, wherein it comprises a first device embodying the user interaction means, the audio signal outputting means and the (first) processor means and a second device embodying an audio signal memory means and having a second processor means, said first and second devices being linked by a communication means, the arrangement being such that, in response to a predetermined user interaction with the first device, the first processor means communicates a command to the second device over the communications link and on receipt of said command the second processor means controls the memory means to retrieve the selected audio signal, said second processor means communicating said selected audio signal to the first device for outputting on the audio signal outputting means.

30. An apparatus as claimed in claim 29, wherein the second device includes an audio synthesiser means, said selected audio signal being retrieved from the memory means in a digitised format and being converted by the synthesiser means to an audio format for communication to the first device.

31. An apparatus as claimed in claim 29, wherein the first device communicates the command to the second device over the communications link by DTMF tones.

32. An apparatus a claimed in claim 29, wherein the first and second devices comprise a selection from a desktop telephone, a mobile telephone handset, a computer and a telephone subscriber server system.

33. An audio signal output device, comprising:
a storage medium for storing an audio signal;
a speaker for outputting said stored audio signal;
control means for enabling said storage medium to transmit said stored audio signal to said speaker on receipt by the control means of a control signal, wherein said stored audio signal encapsulates a prosodic pattern innately recognizable to humans, and said signal comprises a small number of tones sufficient to convey to a user of the device only said prosodic pattern.

34. An audio signal output device as claimed in claim 33, wherein the storage medium comprises a processor accessible memory, said audio signal being stored in said memory in digitised format and said control means comprises a processor for executing application software in conformity with the received control signal data, said processor controlling said memory to retrieve the stored digitised audio signal in response to predetermined control signal data.

35. An audio signal output device as claimed in claim 34, wherein the control signal data input to the processor results from human interaction with devices connected to said audio signal output device.

36. A method for outputting an audio signal in an electrical/electronic apparatus having means by which a user can interact with the apparatus, comprises the steps of:
outputting said audio signal on speaker means; and
controlling said speaker means to output the audio signal in association with a user interaction with the apparatus, wherein said audio signal encapsulates a prosodic pattern recognizable to humans and said signal comprises a small number of tones sufficient to convey to the user only said prosodic pattern.

37. A method as claimed in claim 36, wherein it includes the step of storing said audio signal on an audio signal storage medium; and said controlling step includes controlling said audio signal storage medium to output the audio signal in association with a user interaction with the apparatus.

38. A method as claimed in claim 36, wherein it includes processing data input to the apparatus by a user in conformance with application software being executed by a processor means of the apparatus, whereby said processor means initiates outputting of the audio signal dependent upon the result of the user input data processing step.

39. A method as claimed in claim 38, wherein said processor means initiates outputting of a selected one of a plurality of audio signals, each of said signals encapsulating a prosodic pattern recognisable to humans.

40. A method as claimed in claim 36, wherein said audio signal is selected as being one which is innately recognisable to humans.

41. A method as claimed in claim 36, wherein it further comprises the steps of:
communicating a command from a first device embodying user interaction means, audio signal output means and first processor means to a device embodying an audio signal memory means and second processor means via a communications means linking the first and second devices, said command being communicated in response to a user interaction with the first device;
receiving said command at the second device and controlling said audio message memory means by said second processor means to retrieve a stored audio signal from the memory means;

communicating said retrieved audio signal to the first device; and controlling said audio signal outputting means of the first device by the first processor means to output said audio signal.

42. A method as claimed in claim 41, wherein it includes retrieving one of a plurality of audio signals stored in a digitised format in the memory means of the second device.

43. A method as claimed in claim 41, wherein it includes synthesising said retrieved audio signal at the second device to convert it to an audio format prior to communicating said synthesised signal to the first device.

44. A method for outputting an audio signal in an electrical/electronic apparatus having means by which a user can interact with the apparatus, comprising the steps of:

outputting said audio signal on speaker means; and controlling said speaker means to output the audio signal in association with a user interaction with the apparatus, wherein said audio signal encapsulates a prosodic pattern innately recognizable to humans, said signal comprising a small number of tones sufficient to convey to the user only said prosodic pattern, said method comprising the further steps of:

communicating a command from a first device embodying user interaction means, audio signal output means and first processor means to a second device embodying an audio signal memory means and second processor means via a communication means linking the first and second devices, said command being communicated in response to a user interaction with the first device; on receipt of said command at the second device, controlling said audio message memory means by said second processor means to retrieve a stored audio signal from the memory means; communicating said retrieved audio signal to the first device; and controlling said audio signal outputting means of the first device by the first processor means to output said audio signal.

45. A method as claimed in claim 44, wherein it includes synthesising said retrieved audio signal at the second device to convert it to an audio format prior to communicating said signal to the first device.

46. A method as claimed in claim 44, wherein it includes retrieving one of a plurality of audio signals stored in digitised format in the memory means of the second device.

* * * * *